Patented Jan. 18, 1949

2,459,539

UNITED STATES PATENT OFFICE 2,459,539

PREPARATION OF ALKYL-SUBSTITUTED HALOGENOSILANES

Eugene G. Rochow, Schenectady, N. Y., assignor to General Electric Company, a corporation of New York No Drawing. Application May 22, 1947, Serial No. 749,875

9 Claims. (Cl. 260—448.2)

The present invention relates to the preparation of alkyl-substituted halogenosilanes. It is particularly concerned with a method for forming an alkyl halogenosilane wherein the alkyl group is attached to the silicon atom by a C—Si bond, which method comprises reacting with silicon at an elevated temperature a mixture comprising (1) an ether corresponding to the general formula ROR′ where R and R′ are each a lower alkyl group having from 1 to 4 carbon atoms, and (2) a hydrogen halide, preferably an anhydrous hydrogen halide, for example, hydrogen chloride, hydrogen bromide, hydrogen fluoride, etc.

It was known prior to my invention that hydrocarbon halides could be caused to react with elements other than silicon. For example, the reaction of hydrocarbon halides with magnesium in certain solvents to yield the so-called "Grignard reagent" is well known. Another example is the reaction of zinc or the zinc-copper couple with alkyl halides to give alkyl zinc halides similar in chemical behavior to the Grignard reagent. Zinc dimethyl also has been prepared by heating metallic zinc with methyl bromide or iodide in the liquid state in a sealed tube.

The reaction of hydrogen chloride with silicon also was known. Thus Combes [Compt. rend., 122, 531 (1896)] obtained a mixture of approximately 80% trichlorosilane (silicochloroform) and 20% silicon tetrachloride by passing hydrogen chloride through an iron tube filled with silicon heated to 300° to 400° C.

In Rochow U. S. Patent 2,380,995, issued August 7, 1945, and assigned to the same assignee as the present invention, there is disclosed and broadly claimed the method of preparing organohalogenosilanes, more particularly, hydrocarbon-substituted halogenosilanes, which method comprises bringing a hydrocarbon halide into contact with heated silicon.

The preparation of organohalogenosilanes in accordance with the process disclosed and claimed in the above-mentioned Rochow patent is accompanied by a major economic disadvantage. In the preparation of, for example, methyl-substituted halogenosilanes, the halogen, which in the case of chlorine represents two-thirds of the molecular weight and therefore two-thirds of the cost and transportation charge, is necessarily removed in the hydrolytic reaction and does not appear in the final liquid or resinous product obtained from the methyl chlorosilanes.

I have now discovered that I am able to prepare alkyl-substituted halogenosilanes using lower alkyl ethers and a hydrogen halide, both of which materials are relatively inexpensive and which, in the case of dimethyl ether and hydrogen chloride, sufficiently overcome the disadvantage discussed in the preceding paragraph. Moreover, the hydrogen halide formed during the hydrolysis of the halogenosilane may be recovered, recycled, and used, again in my claimed process.

In accordance with my invention, the alkyl ether and hydrogen halide are simultaneously brought in contact with heated silicon while the latter is advantageously in a comminuted state, and preferably while intimately associated with a catalyst for accelerating the formation of the alkyl-substituted halogenosilanes.

The hydrogen halide may be mixed with the alkyl ether while they are both preferably in the vapor state and thereafter passed over the heated silicon. If desired, the hydrogen halide may be passed over the surface of, or bubbled through a reservoir of the alkyl ether held at any desired temperature. In many cases this latter method in which the hydrogen halide, preferably, in the gaseous state, may also function as a carrier for the reactive alkyl ether vapor, is preferred since the rate of flow of the gaseous mixture through the apparatus can be controlled by regulating the rate of flow of the hydrogen halide into the reservoir while the amount of the reactive alkyl ether carried into contact with the heated silicon by the hydrogen halide can be controlled by varying the temperature of the alkyl ether, i. e., the vapor pressure of the alkyl ether.

Although the hydrogen halide may be mixed with the alkyl ether in all proportions by weight or by volume, the actual amount of the hydrogen halide used will depend upon the desired ratio of alkyl groups to halogen atoms in the product. Thus, in preparing the alkyl-substituted halogenosilane, I may advantageously use from about 0.1 mol to 3 mols of the hydrogen halide per mol of the alkyl ether employed. Preferably, for each mol of the alkyl ether used in the reaction I may mix or employ from approximately 0.2 to 1 mol of the hydrogen halide per mol of alkyl ether. On a volume basis, i. e., on a gas volume basis, the preferable amount of hydrogen halide employed in the production of a mixture of alkyl-substituted halogenosilanes, especially the methyl halogenosilanes, is advantageously about 10 to 50 per cent of the total volume of the mixture of the alkyl ether and hydrogen halide.

In order that those skilled in the art may better understand how the present invention may be practiced, the following examples are given by way of illustration and not by way of limitation. All parts are by weight.

Example 1

A mixture comprising, by weight, 90 per cent powdered silicon and 10 per cent finely divided copper was fired in a hydrogen atmosphere at 1050° C., cooled, pressed into blocks and the blocks broken into small lumps of convenient size. The aforementioned copper-silicon lumps were packed into a glass reaction tube to which a water condenser had been sealed. Gases issuing from the receiver of the water condenser tube were then passed through a dry ice-acetone low-temperature trap and collected therein. The reaction tube was heated to a temperature of about 325° C. Dimethyl ether and anhydrous, i. e., dry, hydrogen chloride, in a volume ratio of about 2 to 1, were led simultaneously into the charged reaction tube for a period of approximately 6 hours while the temperature in the reaction tube was maintained at an average temperature of approximately 325° C. A sample of the liquid condensate (obtained as a result of the reaction), which comprised a mixture of methylchlorosilanes, was stirred into a mixture of ice, water, and diethyl ether where it hydrolyzed to give an ether-soluble resinous condensation product which was identified as a methyl polysiloxane (methyl silicon resin). Tests conducted on the aforementioned liquid condensate indicated the presence of chlorosilanes containing methyl groups attached directly to silicon by C—Si linkages as well as chlorine attached directly to silicon.

Example 2

Using the same apparatus as in Example 1, a glass reaction tube was charged with a fresh, fired silicon-copper mixture prepared in accordance with the instructions outlined in Example 1. A mixture of equal volumes of dimethyl ether and hydrogen chloride was passed through the reaction tube over the heated silicon mixture for a period of 12 hours while the temperature within the tube was maintained at an average temperature of about 329° C. The liquid condensates from this reaction were mixed with the liquid condensates obtained in Example 1. These combined liquids were distilled in a low temperature fractionating column. Unchanged methyl ether and a small amount of dichlorosilane ($H_2SiCl_2$) were removed as distillates. The portion of the liquid boiling above room temperature was subjected to further fractionation in an analytical still. This latter distillation showed that the liquid contained a mixture of methylchlorosilanes, including a preponderant proportion of methyltrichlorosilane and a smaller proportion of dimethyldichlorosilane, as well as some trichlorosilane and tetrachlorosilane.

Example 3

Passage of a mixture of dimethyl ether and hydrogen chloride in a volume ratio of about 4 to 1 for 10 hours at an average temperature of about 331° C. over a fresh charge of the silicon-copper mixture prepared in accordance with the directions in Example 1 resulted in the production of a liquid condensate which was shown to comprise a mixture of methylchlorosilanes.

Example 4

In this example, dimethyl ether and hydrogen chloride in a volume ratio of about 5 to 1 were passed over a fresh charge of the copper-silicon mixture prepared in accordance with the directions in Example 1, which was heated to a temperature of about 329° to 334° C. At the end of 10 hours of passage of the mixed gases, there was obtained a condensate comprising a mixture of methylchlorosilanes.

Using the same apparatus as employed in Example 1, another charge of the copper-silicon powder described in Example 1 was heated in the glass reaction tube while a mixture of dimethyl ether and hydrogen chloride present in a volume ratio of about 5 to 1 was passed over the heated silicon mass. The temperature throughout the passage of the ether and hydrogen chloride was maintained at an average of about 326° C. for 8½ hours. The total condensates obtained in Example 3 and in the two tests conducted in this example were combined and fractionally distilled in a low-temperature fractionating column to establish that the reaction products comprised a mixture of methylchlorosilanes, including dimethyldichlorosilane and methyltrichlorosilane.

It is, of course, understood that my invention is not limited to the specific alkyl ether employed in the above illustrative examples. Examples of alkyl ethers other than dimethyl ether which may be caused to react with silicon at elevated temperatures in the presence of a hydrogen halide with comparable results are methyl ethyl ether, diethyl ether, dipropyl ether, di-isopropyl ether, ethyl propyl ether, dibutyl ether, methyl butyl ether, ethyl butyl ether, etc. It is preferred that both alkyl groups attached to the oxygen in the ether be the same and be the alkyl group desired in the final product, i. e., the alkyl-substituted halogenosilane.

Although the reaction may be carried out in the absence of catalysts for the reaction, it is preferred that the reaction be effected in the presence of metallic catalysts, examples of which, in addition to the copper disclosed in the foregoing examples are, for instance, nickel, tin, antimony, manganese, silver, titanium, etc. Additional information concerning the use of the catalysts may be found in the aforementioned Rochow U. S. patent 2,380,995.

The preferred reaction temperatures, i. e., the temperatures at which substantial yields of the alkyl-substituted halogenosilanes are obtained depend, in general, on such influencing factors as, for instance, the particular starting materials employed, the other reaction conditions, type of reactor, etc. The preferable range is from 200° to 500° C. Optimum results usually are obtained within the more limited range of 250° to 425° C.

Although hydrogen chloride has been used in the above examples, it is to be understood that other hydrogen halides, for example, hydrogen bromide, hydrogen fluoride, etc., may be substituted. Hydrogen chloride is preferred for economical and operating reasons.

What I claim as new and desire to secure by Letters Patent of the United States is:

1. The method of forming an alkyl-substituted halogenosilane which comprises reacting with silicon at an elevated temperature a mixture comprising (1) an ether corresponding to the general formula ROR' where R and R' are each an alkyl group having from 1 to 4 carbon atoms and (2) a hydrogen halide.

2. The method of forming a methylhalogenosilane which comprises reacting with silicon at an elevated temperature a mixture comprising (1) dimethyl ether and (2) a hydrogen halide.

3. The method of forming an alkyl-substituted chlorosilane which comprises reacting with silicon at a temperature of from 200° to 500° C. a mixture comprising (1) an ether corresponding to the general formula ROR' where R and R' are each an alkyl group containing from 1 to 4 carbon atoms, and (2) hydrogen chloride.

4. The method of forming a methylchlorosilane which comprises reacting with silicon at a temperature of from 200° to 500° C. a mixture comprising (1) dimethyl ether and (2) hydrogen chloride.

5. The method as in claim 4 wherein the hydrogen chloride and the dimethyl ether are both in the gaseous state.

6. The method of forming an alkyl-substituted halogenosilane which comprises heating, at an elevated temperature in the presence of a hydrogen halide, a mixture comprising (1) silicon and (2) an ether in the vapor state corresponding to the general formula ROR', where R and R' are each an alkyl group having from 1 to 4 carbon atoms, while the components are intimately associated with a metallic catalyst for the reaction.

7. The method of preparing a methyl-substituted halogenosilane which comprises heating, at a temperature of from 200° to 500° C. in the presence of a hydrogen halide, a mixture comprising (1) silicon and (2) vaporous dimethyl ether while the components are intimately associated with a metallic catalyst for the reaction.

8. The method as in claim 7 wherein the metallic catalyst for the reaction is copper.

9. The method of forming an alkyl-substituted chlorosilane which comprises reacting with silicon at a temperature of from 200° to 500° C. a mixture comprising (1) an ether corresponding to the general formula ROR' where R and R' are each an alkyl group containing from 1 to 4 carbon atoms, and (2) hydrogen chloride, the hydrogen chloride being present in an amount equal to from 0.1 to 3 mols per mol of the ether.

EUGENE G. ROCHOW.

REFERENCES CITED

The following references are of record in the file of this patent:

UNITED STATES PATENTS

| Number | Name | Date |
|---|---|---|
| 2,380,995 | Rochow | Aug. 7, 1945 |